(12) United States Patent
Moisio et al.

(10) Patent No.: US 12,486,647 B2
(45) Date of Patent: Dec. 2, 2025

(54) METHOD FOR DETERMINING LOCATION SPECIFIC AS-BUILT PERFORMANCE VALUE IN EARTHWORKS CONSTRUCTION SITE

(71) Applicant: Novatron Oy, Pirkkala (FI)

(72) Inventors: Petri Moisio, Pirkkala (FI); Petteri Palviainen, Pirkkala (FI); Mikko Vesanen, Pirkkala (FI); Antti Kolu, Pirkkala (FI)

(73) Assignee: Novatron Oy, Pirkkala (FI)

( * ) Notice: Subject to any disclaimer, the term of this patent is extended or adjusted under 35 U.S.C. 154(b) by 164 days.

(21) Appl. No.: 18/377,748

(22) Filed: Oct. 6, 2023

(65) Prior Publication Data
US 2024/0175245 A1   May 30, 2024

(30) Foreign Application Priority Data
Nov. 29, 2022   (FI) ..................................... 20226060

(51) Int. Cl.
*E02F 9/26*   (2006.01)

(52) U.S. Cl.
CPC .............. *E02F 9/265* (2013.01); *E02F 9/262* (2013.01)

(58) Field of Classification Search
CPC ......... E02F 9/2054; E02F 9/261; E02F 9/262; E02F 9/265; E02F 9/267
See application file for complete search history.

(56) References Cited

U.S. PATENT DOCUMENTS

| | | | |
|---|---|---|---|
| 6,108,949 A | 8/2000 | Singh et al. | |
| 7,643,938 B2* | 1/2010 | Adachi | G08G 1/20 701/485 |

(Continued)

FOREIGN PATENT DOCUMENTS

| | | |
|---|---|---|
| EP | 3489422 A2 | 5/2019 |
| EP | 3489422 A3 | 8/2019 |

(Continued)

OTHER PUBLICATIONS

Office Action issued in Japanese Application 2023-199628, dated Oct. 15, 2024, 4 pages.

(Continued)

*Primary Examiner* — Tyler J Lee
(74) *Attorney, Agent, or Firm* — FisherBroyles, LLP

(57) ABSTRACT

A method for determining a location specific as-built performance value in an earthworks construction site comprises determining an earthworks information model of the earthworks construction site, determining a location of a tool of an earthworks machine in the earthworks construction site and, respectively, in the earthworks information model, determining a work task in the construction site for the earthworks machine from the earthworks information model, determining, based at least in part on the location of the tool of the earthworks machine in the earthworks information model, a location specific part of the determined work task in the construction site, and obtaining as the location specific as-built performance value, from the earthworks machine, at least one of: emissions, energy consumption or elapsed time associated with the location specific part of the determined work task in the construction site.

17 Claims, 5 Drawing Sheets

(56) References Cited

U.S. PATENT DOCUMENTS

| | | | |
|---|---|---|---|
| 9,079,505 B1* | 7/2015 | Hyde | G08G 1/202 |
| 11,049,208 B2* | 6/2021 | Petroff | G05D 1/0221 |
| 12,131,275 B2* | 10/2024 | Wulf | E02F 9/205 |
| 2003/0088321 A1* | 5/2003 | Creger | G05B 13/027 |
| | | | 700/30 |
| 2008/0208415 A1 | 8/2008 | Vik | |
| 2009/0154992 A1 | 6/2009 | Greiner et al. | |
| 2012/0271504 A1 | 10/2012 | Reiners et al. | |
| 2013/0311153 A1 | 11/2013 | Moughler et al. | |
| 2016/0292933 A1 | 10/2016 | Sprock et al. | |
| 2017/0314232 A1 | 11/2017 | Chi et al. | |
| 2018/0174377 A1* | 6/2018 | Collins | E02F 9/261 |
| 2019/0161939 A1* | 5/2019 | Hokkanen | E02F 9/20 |
| 2019/0161942 A1* | 5/2019 | Hokkanen | G06F 3/011 |
| 2020/0166928 A1* | 5/2020 | Sudarsan | G05D 1/0088 |
| 2021/0097462 A1 | 4/2021 | Brickner et al. | |
| 2021/0124359 A1* | 4/2021 | Wei | E02F 3/434 |
| 2021/0125123 A1* | 4/2021 | Subramanian | G06F 3/04815 |
| 2021/0149403 A1* | 5/2021 | Ready-Campbell | |
| | | | G05D 1/0027 |
| 2021/0334720 A1* | 10/2021 | Brockhurst | G06Q 10/06312 |
| 2021/0381201 A1 | 12/2021 | Hoffmann et al. | |
| 2023/0194281 A1* | 6/2023 | Lane | G06Q 10/20 |
| 2023/0196846 A1* | 6/2023 | Braunstein | G07C 5/006 |
| 2023/0419208 A1* | 12/2023 | Wulf | E02F 9/205 |

FOREIGN PATENT DOCUMENTS

| | | |
|---|---|---|
| JP | 11-247230 A | 9/1999 |
| JP | 11-247231 A | 9/1999 |

OTHER PUBLICATIONS

Search Report received for Finnish Application No. 20226060, dated Mar. 7, 2023, 2 pages.

Extended European Search Report received for European Application No. EP23209403.7, dated Apr. 29, 2024, 10 pages.

* cited by examiner

METHOD FOR DETERMINING LOCATION SPECIFIC AS-BUILT PERFORMANCE VALUE IN EARTHWORKS CONSTRUCTION SITE

CROSS-REFERENCE TO RELATED APPLICATION

This application claims benefit and priority to Finnish Application No. 20226060, filed Nov. 29, 2022, which is incorporated by reference herein in its entirety.

BACKGROUND

Field

The invention relates to a method for determining a location specific as-built performance value in an earthworks construction site.

SUMMARY

Different types of earthworks machines may be utilized at different kind of earthworks construction sites for example for moving soil or rock material from one location to another or to level or compact the soil or rock material. Examples of this kind of earthworks construction sites include for example road construction work sites, as well as substructure construction work sites for buildings or construction sites for parking areas. The work machines applied in the earthworks construction sites are for example excavators, dumpers or other earthworks transport machines, and drum rollers.

Ever-increasing demands for minimizing emissions in every sector of economy, also including the earthworks construction sites, set demands also for an efficient execution of the earthworks construction sites for minimizing the emissions of the earthworks construction site. Such a course of development leads to a situation that a selection of a contractor for an earthworks construction site will be dependent also on predicted emissions and measured emissions needed to complete the earthworks construction site. To be aware of emissions caused by a planned project the contractor must be aware of emissions of work phases necessary to complete the earthworks construction site. In the future, to be able to win competitive biddings of earthworks construction site contracts, the contractor should find efficient low emission ways to carry out the earthworks construction projects.

In order to achieve the efficient execution of the earthworks construction site, efficient applicable working methods should be applied for carrying out work phases necessary to complete the earthworks construction site. A problem is, however, a reliable selection of efficient applicable working methods to be applied because of a diversity of different earthworks construction sites as such and different internal activities and tasks related to execution of the earthworks construction site as well as different activities external from the construction site because of different interactions of the earthworks construction site with activities that are carried out outside of the earthworks construction site but that are still interrelated with the efficiency of the execution of the earthworks construction site. These activities include for example manufacturing and transportation of materials to be utilized in the earthworks construction site. Therefore, there is a need for a solution that may be applied for a reliable determination of efficiencies of different working methods.

The information or data or knowledge from various earthwork construction sites where different working methods have been used may furthermore be used for selecting the working methods to be applied for executing a specific earthworks construction site efficiently and thereby be the contractor who can provide lower emissions per project than the competitors.

An object of the present invention is to provide a novel method for determining a location specific as-built performance value in an earthworks construction site.

The invention is characterized by the features of the independent claim.

The invention is based on the idea of determining an earthworks information model based location specific as-built performance value in an earthworks construction site, comprising determining an earthworks information model of the earthworks construction site, determining a location of a tool of an earthworks machine in the earthworks construction site and, respectively, in the earthworks information model, determining a work task in the construction site for the earthworks machine from the earthworks information model, determining, based at least in part on the location of the tool of the earthworks machine in the earthworks information model, a location specific part of the determined work task in the construction site, and obtaining as the location specific as-built performance value, from the earthworks machine, at least one of: emissions, energy consumption or elapsed time associated with the location specific part of the determined work task in the construction site.

An advantage of the invention is that a location specific as-built performance value in the construction site regarding at least one of the emissions, energy consumption or elapsed time regarding to a specific location specific part of the determined work task may be accurately determined. This provides that information about efficiencies of different working methods may be accurately determined, which information can be used later for selecting working methods to be applied for executing another earthworks construction sites efficiently. It is also possible to measure, on a site-by-site basis and regarding to the one or more location specific parts of the determined work task, only one of the emissions, energy consumption or elapsed time, or some combination thereof if that provides a sufficient measure for the location specific as-built performance value in the earthworks construction site.

Some embodiments of the invention are disclosed in the dependent claims.

According to an embodiment of the method, the method comprises determining an earthworks information model of the earthworks construction site, determining a location of a tool of an earthworks machine in the earthworks construction site and, respectively, in the earthworks information model, determining a work task in the construction site for the earthworks machine from the earthworks information model, determining, based at least in part on the location of the tool of the earthworks machine in the earthworks information model, a location specific part of the determined work task in the construction site, and obtaining as the location specific as-built performance value, from the earthworks machine, at least one of: emissions, energy consumption or elapsed time associated with the location specific part of the determined work task in the construction site.

According to an embodiment of the method, the method further comprises determining an orientation of the tool of the earthworks machine in at least one degree of freedom, wherein determining the location specific part of the determined work task in the construction site is further based at least in part on the at least one degree of freedom of the tool of the earthworks machine.

According to an embodiment of the method, the determination of the location of the tool of the earthworks machine comprises determining three-dimensional location and orientation of the tool, wherein determining the location specific part of the determined work task in the construction site is based at least in part on the three-dimensional location and orientation of the tool of the earthworks machine.

According to an embodiment of the method, the earthworks information model of the earthworks construction site comprises at least one of: a surface model or geometric model.

According to an embodiment of the method, the earthworks information model is based on at least one of the following: Geospatial Information System (GIS), Building Information Modelling (BIM), Infra or Infrastructure Building Information Modelling (I-BIM), Civil Information Model (CIM), Project Information Model (PIM) or SmartCity Platform.

According to an embodiment of the method, the method further comprises determining at least one feature of the tool of the earthworks machine, wherein the at least one feature of the tool of the earthworks machine is at least one of the following: weight, width, height, maximum length/extend, capacity, volume, amplitude, diameter, wear out, service life, manufacturing material, or predetermined service life.

According to an embodiment of the method, the method further comprises determining at least one feature of the earthworks machine, wherein the at least one feature of the earthworks machine is at least one of: weight, width, height, torque, maximum power, wear out of an essential wear part of the machine, service life of an essential wear part of the machine, manufacturing material of an essential wear part of the machine, predetermined service life of the machine, length of at least one boom part, track model, track wear out, wheel model, or wheel wear out.

According to an embodiment of the method, the method comprises obtaining, from the earthworks machine, a plurality of the at least one of: emissions, energy consumption or elapsed time associated with the location specific part of the determined work task in the construction site, and determining a total amount of the plurality of the at least one of: emissions, energy consumption or elapsed time obtained from the earthworks machine and associated with the location specific part of the determined work task in the construction site.

According to an embodiment of the method, the method further comprises completing, by the earthworks machine, the location specific part of the determined work task in the construction site, and determining an amount of the at least one of: emissions, energy consumption or elapsed time associated with the completed location specific part of the determined work task in the construction site from all the obtained at least one of: emissions, energy consumption or elapsed time associated with the location specific part of the determined work task in the construction site to complete the location specific part of the determined work task in the construction site.

According to an embodiment of the method, the method further comprises determining, respectively, a default amount of at least one of: emissions, energy consumption or elapsed time for completing a location specific part of the determined work task in the construction site, and determining an overall efficiency for the location specific part of the determined work task in the construction site by comparing the amount of the at least one of: emissions, energy consumption or elapsed time associated with the completed location specific part of the determined work task in the construction site to the default amount of the at least one of: emissions, energy consumption or elapsed time for completing the location specific part of the determined work task in the construction site.

According to an embodiment of the method, the default amount of the at least one of: emissions, energy consumption or elapsed time for completing the location specific part of the determined work task in the construction site is an average amount for the same work task by at least one of: similar earthworks machine or a different earthworks machine.

According to an embodiment of the method, the method further comprises determining from the earthworks information model a mass volume to be moved to complete the location specific part of the determined work task in the construction site, determining a mass efficiency for the location specific part of the determined work task in the construction site by comparing the mass volume to be moved to complete the location specific part of the determined work task in the construction site to the amount of the at least one of: emissions, energy consumption or elapsed time associated with the completed location specific part of the determined work task in the construction site.

According to an embodiment of the method, the method further comprising completing a plurality of location specific parts of the determined work task in the construction site, determining from the earthworks information model a mass volume to be moved for each of the plurality of location specific parts of the determined work task in the construction site, and determining a completion rate of the determined work task in the construction site by comparing the total mass volume moved regarding the plurality of the competed location specific parts of the determined work task in the construction site to the mass volume to be moved to complete all the location specific parts of the determined work task in the construction site.

According to an embodiment of the method the earthworks machine is a first earthworks machine, and the method further comprises obtaining, from at least one second earthworks machine, respectively, at least one of: emissions, energy consumption or elapsed time associated with the location specific part of the determined work task in the construction site of the first earthworks machine.

According to an embodiment of the method the at least one second earthworks machine is an earthworks transport machine and the at least one of: emissions, energy consumption or elapsed time associated with the location specific part of the determined work task in the construction site of the first earthworks machine regarding the second earthworks machine further contains, respectively, at least one of: emissions, energy consumption or elapsed time regarding the transported material.

According to an embodiment of the method, the method further comprises determining at least one portion of the earthworks machine related to moving the tool of the earthworks machine, determining at least one of: acceleration data or angular velocity data for the movement of the at least one portion of the earthworks machine for the location specific part of the determined work task in the construction site, calculating a movement difference value for the at least one of: acceleration data or angular velocity data for the location specific part of the determined work task in the construction site, and determining a performance factor from the movement difference value to the location specific part of the determined work task in the construction site.

According to an embodiment of the method the earthworks machine is an excavator and the at least one portion is at least one of: a boom part, a joint in a boom structure, an upper carriage of the excavator or an undercarriage of the excavator.

According to an embodiment, the work task is an operation or a set of operations that the earthworks machine should carry out at the earthworks construction site to advance a completion of the construction site or an area to be worked on in the construction site, an area unit in the area to be worked on in the construction site or a layer in at least either of them.

BRIEF DESCRIPTION OF THE DRAWINGS

In the following the invention will be described in greater detail by means of preferred embodiments with reference to the accompanying drawings, in which

FIG. 4 shows schematically a cross-sectional view of an area to be worked on;

For the sake of clarity, the figures show some embodiments of the invention in a simplified manner. Like reference signs identify like elements in the figures.

DETAILED DESCRIPTION

Figure 1:
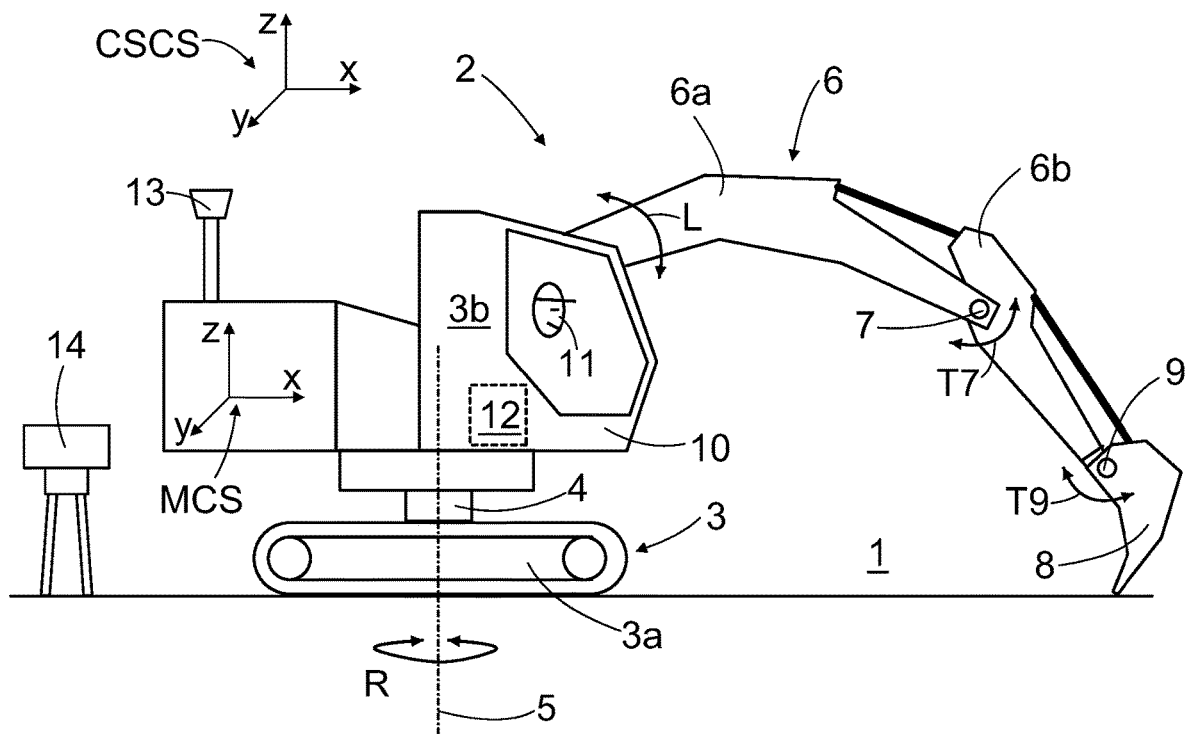
FIG. 1 shows schematically a side view of an excavator at an earthworks construction site.

FIG. 1 is a schematic side view of an excavator 2 on an earthworks construction site 1 wherein the excavator 2 is intended to be operated. The excavator 2 is only one example of an earthworks machine in connection with which the solution described herein may be utilized, and the solution described may as well be applied in connection with any other earthworks machine, such as a bulldozer, wheel loader, motor grader, compaction machine, piling machine, deep stabilization machine, surface top drilling machine, haul machine, haul truck, dumper, rock crusher, paver, backhoe loader, earthworks transport machine or other earthworks machine that at some point takes part in the work on the earthworks construction site 1.

The excavator 2 comprises a movable carriage 3 comprising an under carriage 3a, i.e., a lower carriage 3a, and an upper carriage 3b. The lower carriage 3a comprises caterpillar bands but could alternatively be provided with wheels, for example. The upper carriage 3b is connected to the lower carriage 3a by means of a rotation axle 4 of the upper carriage 3b. The upper carriage 3b may be rotated relative to the lower carriage 3a around a rotation axis 5 as shown schematically with a double-headed arrow R. The rotation axis 5 coincides to a centre axis of the rotation axle 4.

The excavator 2 further comprises a boom 6 connected to the upper carriage 3b, whereby the boom 6 is arranged to turn together with the upper carriage 3b. The boom 6 may comprise at least a first boom part 6a. The boom 6 may also comprise further boom parts, such as a second boom part 6b. The boom 6 may be lifted and lowered relative to the upper carriage 3b as shown schematically with a double-headed arrow L.

The second boom part 6b may be connected to the first boom part 6a by means of a joint 7, allowing the second boom part 6b to turn about the first boom part 6a as shown schematically with a double-headed arrow T7. At a distal end of the second boom part 6b there is a tool of the excavator 2, in this case a bucket 8, and between the bucket 8 and the second boom part 6b there may be a joint 9, allowing the bucket 8 to be turned with respect to the second boom part 6b as shown schematically with a double-headed arrow T9. In connection with the joint 9 there may also be other joints or mechanisms allowing the bucked to be tilted in a sideward direction, for example.

On the carriage 3 there may be a control cabin 10 for an operator 11 of the excavator 2. The control cabin 10 may, for example, be provided with a moving arrangement allowing a vertical position of the control cabin 10 to be adjusted relative to the carriage 3. Likewise, the excavator 2 may be cabinless and it may be operated remotely, or it may even be autonomous.

The excavator 2 further comprises at least one control unit 12 which is configured to control, in response to received control actions, operations of the excavator 2, such as operations of the carriage 3, the boom 6 and the bucket 8. The control unit 12 forms at least a part of a control system of the excavator 12. At least one portion or part of the excavator, such as the undercarriage 3a, the upper carriage 3b, the boom 6 and the parts 6a, 6b thereof, a bucket 8 or a joint in connection of any one of those portions or parts may be provided with at least one sensor for measuring an acceleration data or angular velocity data of the movement of the respective portion or part of the excavator 2.

The excavator 2, as well as any other earthworks machine in the work site that executes location specific earthworks, needs to determine the location of the tool of the earthworks machine in the earthworks construction site 1. The determination may be implemented in these earthworks machines in various ways. According to an option, the location of the tool of the earthworks machine in the earthworks construction site 1 is determined directly, or according to another option, the location of the earthworks machine in the earthworks construction site 1 is determined and the location of the tool of the machine is determined with respect to the machine. The earthworks machines like the excavator 2 may comprise a number of satellite receiving devices, such as one or more antennas 13, if the excavator 2 is intended to be able to utilize a kind of a satellite-based positioning system like GNSS (Global Navigation Satellite Systems). The one or more antennas 13 may for example be placed on the upper carriage 3b. The satellite-based positioning system GNSS may be applied for determining a location and orientation of the excavator 2 in the earthworks construction site 1 and thereafter the location of the tool of the excavator 2 will be determined for example by the control system, such as the control unit 12 of the excavator 2. Additionally, or alternatively, for determining the location and orientation of the tool of the earthworks machine, like the excavator 2, in the earthworks construction site 1, one or more tracking devices 14 capable for tracking, either alone or in combination with at least one other device, the location and orientation of the earthworks machine, like the excavator 2, in the earthworks construction site 1, may be utilized. Examples of that kind of devices are a camera, a stereocamera, a lidar, a radar and a tachymeter. The device(s) like that may be set either on the excavator 2 or on the earthworks construction site 1. The tracking devices further need information regarding their location in the construction site to track the location of the earthworks machine, like the excavator 2. There are various ways to determine a location of a tracking device, like reference locations in the construction site, or close to the construction site, and satellite-based positioning. Determining a location of a tracking device is generally known for a person skilled in the art and therefore is not considered herein in more detail.

An example of an earthworks machine not doing exact location specific earthworks is a transport vehicle, such as a dumper or lorry, since mostly the location of the transported material is being altered by an earthworks machine that levels the pile of the transported material into larger area and takes care of determining whereto the material is levelled. The transport vehicle still knows exactly where the pile of material was unloaded. In addition, there are still cases where a transport vehicle carries out or executes exact location specific earthworks such that there is no other earthworks machine altering the location of the unloaded material. One such case is discussed below in connection with unloading the pile of material by slowly driving. The essential thing with this kind of material transporting earthworks machines is that they must know where the transported material comes from and what kind of emissions, energy consumption and/or elapsed time relate to the transported material, such as emissions, energy consumption and/or elapsed time for preparing the material and loading the material to the transport vehicle, as well as the emissions, energy consumption and/or elapsed time of the transport vehicle regarding the transported material. When the transport vehicle transports for example a pile of material to an excavator 2, the excavator 2 by some means receives the data regarding the emissions, energy consumption and/or elapsed time of the pile of material and a mass volume of the pile of material. For example, the transport vehicle may inform a location of the pile, the mass volume of the pile and the emissions, energy consumption and/or elapsed time associated with the pile to the excavator directly or via a server of the earthworks construction site 1. Thereafter the excavator 2 can receive or retrieve the data and associate the emissions, energy consumption and/or elapsed time regarding the material to an area to be worked on or an area unit in the area to be worked on or to each area or each area unit to be worked on as it associates its own emissions, energy consumption and/or elapsed time with the respective area or area unit. The location data regarding whereto the transport vehicle transported the pile of material may be gathered by any known method. For example, the transport vehicle with its location determination equipment may be aware of the location and possibly also the orientation or heading of the rear end of the platform, wherein the rear end of the platform may be regarded as the tool tip of the transport vehicle. Thus, when the pile of material is unloaded, the location and possibly also the orientation or heading of the rear end of the platform is detected and may be used when determining the location of the unloaded pile of material. It should be noted that the location may be a point location determining the center of the pile or a point location with circle radius data. This is in many cases sufficient if the material is unloaded to essentially the same place. For determining whereto the pile of material was unloaded, alternatively the operator of the transport vehicle may have suitable equipment, for example a hand tool, for determining the location of the unloaded pile of material, likewise, either as a point location and possibly with circle radius data or a location of the surface area.

On the other hand, the location may be a surface area if the material is unloaded while simultaneously slowly driving the transport vehicle. In this case the width of the rear end of the platform may be known as well. If the location for the unloaded material is a surface area, it may cover an area to be worked on or an area unit in the area to be worked on or one or more areas or area units to be worked on, and it does not necessarily need the excavator 2 to receive the data regarding the material, but the transport vehicle, or the operator of the transport vehicle, may inform the data to the server of the earthworks construction site 1 regarding the location of the area to be worked on or an area unit in the area to be worked on or one or more areas or area units to be worked on, the emissions, energy consumption and/or elapsed time regarding the material and a mass volume of the material as well as how the material was distributed between the one or more areas or area units to be worked on.

In addition, in each of these alternatives for determining the location of the pile, the location information may additionally contain information regarding which layer of the area in question is the pile of material transported for. This layer data may be derived from the data regarding a completion rate in that location of the earthworks construction site, for example, by comparing the completion times, i.e., timestamps, of the conducted or completed work tasks with the time, i.e., timestamp, regarding the unloading of the pile of material or the time, i.e., timestamp, of the informing of the unloading of the pile of material occurred. The layers are discussed in more detail later, for example, regarding FIG. 4. Alternatively, if the excavator 2 that is used to level the pile of material is close to the unloaded pile of material, the excavator 2 may assist the transport vehicle in determining the location of the pile of material as well as in determining the layer in question, and the transport vehicle provides the mass volume of the pile and the emissions, energy consumption and/or elapsed time associated with the pile either to the excavator 2 directly or via a server of the earthworks construction site 1.

Figure 2:
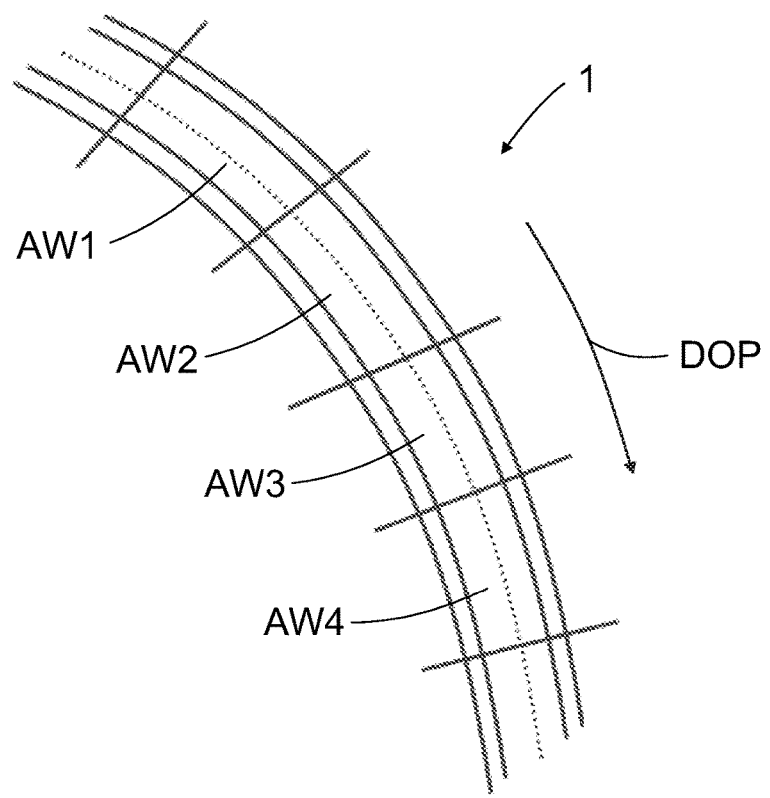
FIG. 2 shows schematically an upper view of an earthworks construction site.

FIG. 2 shows schematically an upper view of an earthworks construction site 1. The earthworks construction site 1, which may below be abbreviated also as the construction site 1, has in FIG. 2 a form of a road construction site. The road construction site of FIG. 2 has been divided, with transversal lines, in the longitudinal direction of the road into several successive areas. These successive areas are typically dubbed as pile spacings, which are used to denote a location of the road. A length of a single pile spacing may for example be about 10 metres but the length may vary depending for example on the type of ground or a method of construction. The geometry of the road is in turn tied to a centre line of the road such that borders of the road are at a certain distance from the centre line.

Each pile spacing typically forms a respective area to be worked on, having therefore an area of a limited size to which specific work tasks are subjected to advance a progress and completion of the construction site 1. The work task is an operation or a set of operations that the earthworks machine should execute or carry out at the respective area to be worked on for advancing the progress of the respective area to be worked on regarding the work task, or some part of the area to be worked on, i.e., an area unit in the area to be worked on, regarding the work task. Each area to be worked on forms an area where data describing efficiency or efficiencies of working methods applied in that area is associated with, wherein the said efficiency or efficiencies may be represented by a location specific as-built performance value. The actual size of the area to be worked on is dependent on a desired accuracy of the location specific as-built performance value to be determined.

In the example of FIG. 2 some areas to be worked on of the road construction site 1 are schematically denoted with reference signs AW1, AW2, AW3 and AW4, wherein the reference sign AW1 refers to a first area to be worked on, the reference sign AW2 refers to a second area to be worked on, the reference sign AW3 refers to a third area to be worked on and the reference sign AW4 refers to a fourth area to be worked. Later in this description, the reference sign AW may be generally used to denote any single area to be worked on or two or more areas to be worked on. An intended direction of the progress of the construction site 1 of FIG. 2 is denoted schematically with an arrow DOP.

Figure 3:
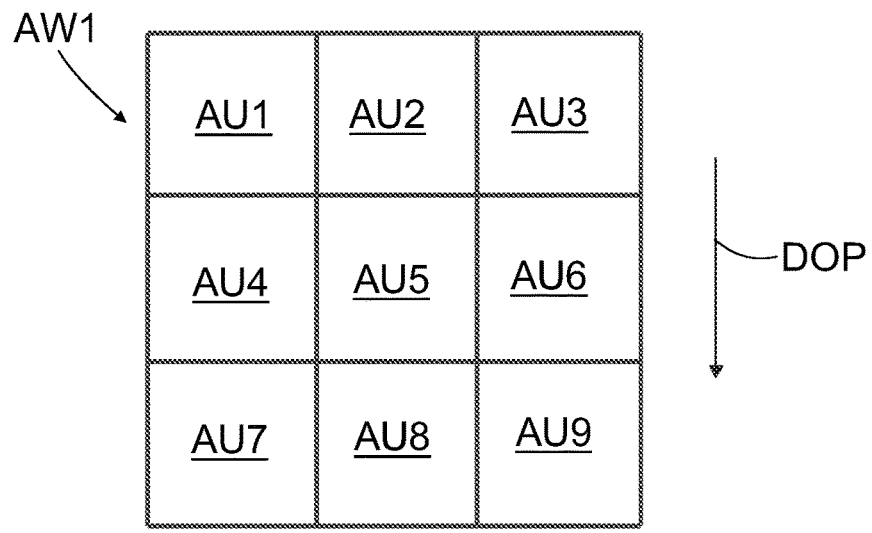
FIG. 3 shows schematically an upper view of an area to be worked on in the earthworks construction site of FIG. 2.

FIG. 3 shows schematically an upper view of the first area to be worked on AW1 of the construction site 1 of FIG. 2. The first area to be worked on AW1 has further been divided into several area units, i.e., area units to be worked on. In the embodiment of FIG. 3 there are altogether nine area units AU1, AU2, AU3, AU4, AU5, AU6, AU7, AU8 and AU9, which together form, in a horizontal direction of the construction site 1, the first area to be worked on AW1. Later in this description, the reference sign AU may be generally used to denote any single area unit or two or more area units.

Generally, the area to be worked on AW may as such be a single area unit AU, or it could be divided for example into two, three, four, six, eight or twelve area units AU, or for example into a square meter area units AU a number of which would be, depending on a width of the road, even well above 50 area units AU per pile spacing. Other areas to be worked on may as such be area units AU or they may also be divided into several area units AU respectively. The division of the area to be worked on into several area units AU of smaller surface area improves the location specific accuracy of the determination of the location specific as-built performance value to be determined, and therefore, as well, the accuracy of the location specific efficiency in the construction site. In the example of FIG. 3 the division of the first area to be worked on AW1 into several area units AU1 to AU9 of smaller surface area is implemented both in the direction of the progress DOP and in the transversal direction thereof, but generally the division of the area to be worked on AW into several area units AU of smaller surface area may also be implemented only in one of the said directions.

Figure 4:
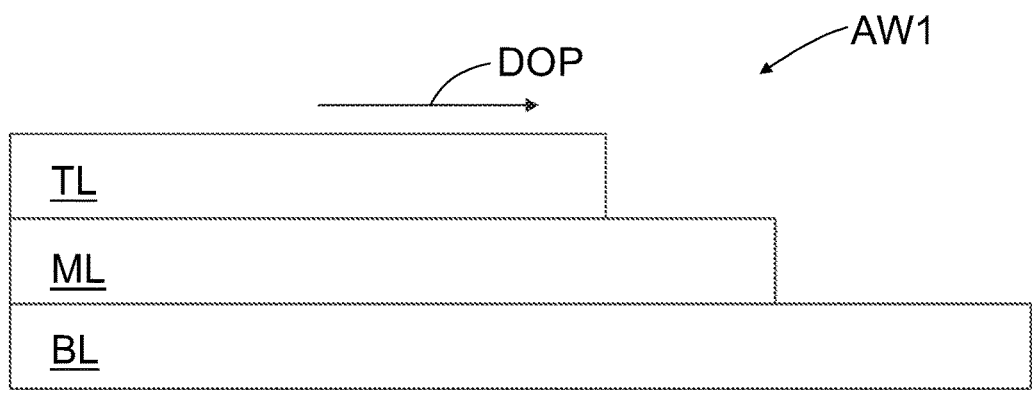

FIG. 4 shows schematically a cross-sectional view of the first area to be worked on AW1 of FIG. 2. FIG. 4 shows several different layers of material, to be more exact a first layer or bottom layer BL, a second layer or middle layer ML, and a third layer or top layer TL, which together form, in a vertical direction of the construction site 1, the first area to be worked on AW1. FIG. 4 describes the progress of the road construction work along the road. The road construction work progresses in stages, i.e., step by step. Different layers may be associated with data describing location specific as-built performance value regarding to the respective area to be worked on AW1 or regarding to the specific area unit AU1 to AU9 of the respective area to be worked on AW1. For the sake of clarity, the cross-sectional hatching of the different layers in FIG. 4 has been omitted. The earthworks construction site 1, and the one or more areas to be worked on thereof, as well as the area units of each area to be worked on and the different layers in the areas to be worked on, may have been designed or determined in an earthworks information model. The earthworks information model is a digital design or model that describes the intended finished, i.e., completed construction site 1. The earthworks information model may, for example, describe materials to be applied in specific layers in specific areas in the construction site 1, intended dimensions of specific layers in specific areas in the construction site 1, intended load rating of specific layers of specific areas in the construction site 1 and possibly specific working methods to be applied to complete the specific layer of each specific area in the construction site 1. The earthworks information model may also comprise specific predetermined work tasks that are needed to be carried out to complete the construction site or some specific layer or specific area thereof. The earthworks information model may also be updated, and more information can be added during the construction, such as as-built data that describes how the earthworks construction site was really built. Work tasks can also be updated regarding the emissions, energy consumption and/or elapsed time during the construction.

The earthworks information model may for example comprise at least one of a surface model or a geometric model. The surface model describes the shape of a single surface for example as a 3D mesh on a construction site 1. The surface represents for example a shape of a top layer of paved asphalt. The geometric model describes geometric relationships of different elements in the model such as layers, surfaces, 2D and 3D locations, lines and meshes in different areas in the construction site 1. These elements represent for example centre lines of roads, locations of drainpipes, locations of light poles etc.

Figure 5:
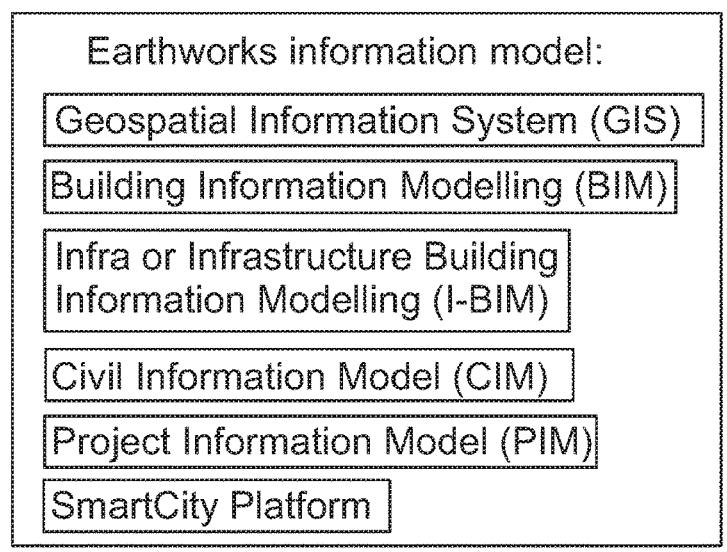
FIG. 5 shows schematically some earthworks information models.

The earthworks information model that may be applied in the solution disclosed herein may for example be based on at least one of the following models: Geospatial Information System (GIS), Building Information Modelling (BIM), Infra or Infrastructure Building Information Modelling (I-BIM), Civil Information Model (CIM), Project Information Model (PIM) and SmartCity Platform, which are shown schematically in FIG. 5. These earthworks information models are generally known for a person skilled in the art and therefore they are not considered herein in more detail.

For providing information to allow a reliable selection of efficient working methods to be applied for carrying out different work tasks and further to complete different kind of construction sites, there should be methods that may be applied to determine efficiencies of different working methods or ways that are applied in earthworks construction sites. The said methods or ways may then be later utilized for the selection of the efficient working methods or ways to be applied for executing future earthworks construction sites in an efficient way. By combining the information from various working methods to different work tasks determined in an earthworks information model planned for an earthworks construction site one may select a working method for each work task or work phase necessary to complete the planned earthworks construction site and thereafter more specifically predict for example the emissions of each work task or work phase related to a planned future earthworks construction site. A solution for providing data or information or knowledge regarding the emissions or other factors relating to various working methods in an earthworks construction site is a method for determining a location specific as-built performance value in an earthworks construction site. The location specific as-built performance value indicates efficiency of a working method or efficiencies of working methods applied in that specific area the location of which in the construction site is known. Necessary or optional operations for determining the location specific as-built performance value in the earthworks construction site may be carried out for example in a control unit of an earthworks machine. The method comprises determining an earthworks information model of the earthworks construction site;

determining a location of a tool of an earthworks machine in the earthworks construction site, and respectively, in the earthworks information model;

determining a work task in the construction site for the earthworks machine from the earthworks information model;

determining, based at least in part on the location of the tool of the earthworks machine in the earthworks information model, a location specific part of the determined work task in the construction site; and obtaining as the location specific as-built performance value, from the earthworks machine, at least one of: emissions, energy consumption or elapsed time associated with the location specific part of the determined work task in the construction site.

Figure 6:
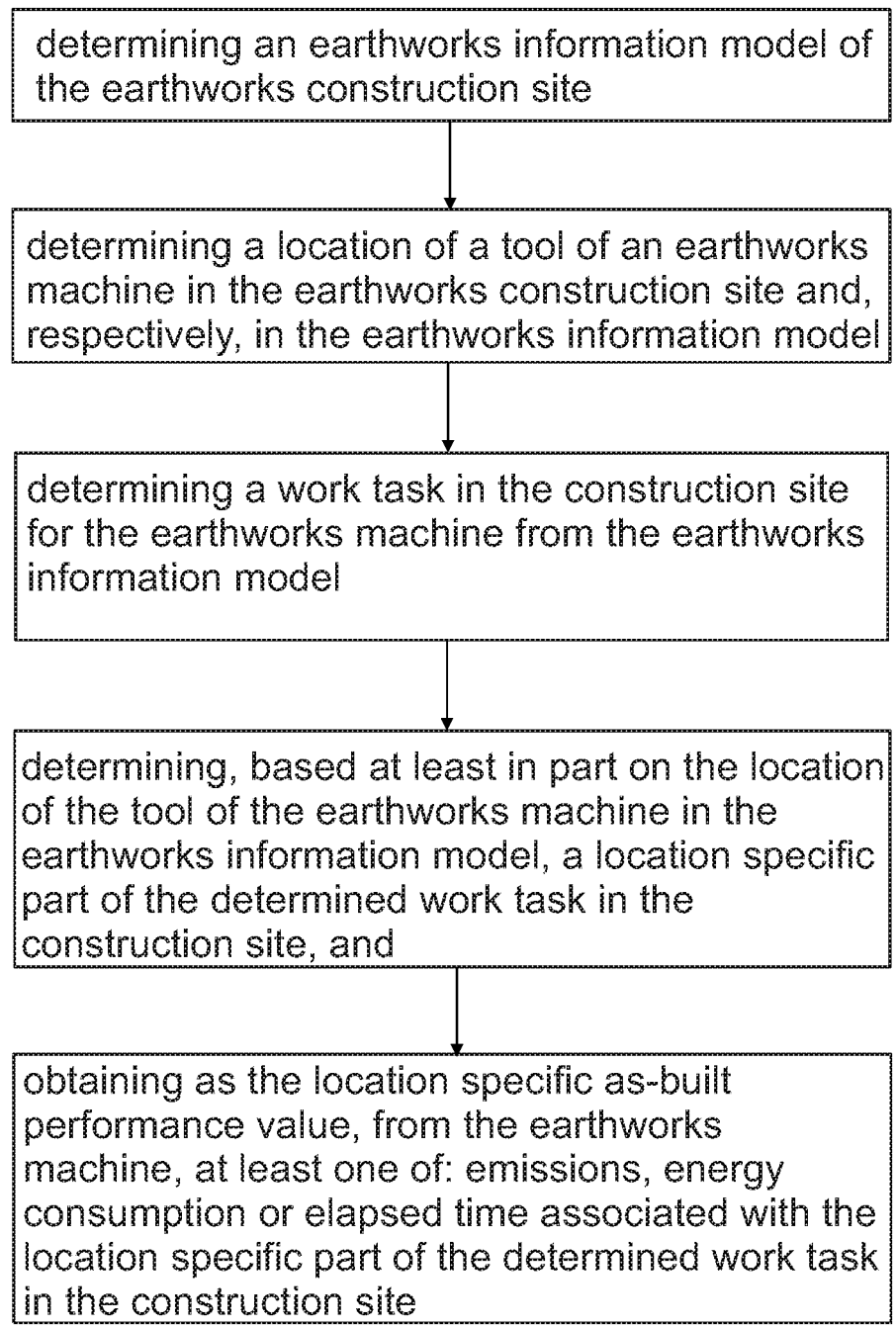
FIG. 6 shows schematically a method for determining a location specific as-built performance value in an earthworks construction site.

In the disclosed method, that is also shown schematically in FIG. 6, the earthworks information model of the earthworks construction site is determined, whereby at least one earthworks information model designed for the earthworks construction site is selected for use. The at least one earthworks information model may for example be based on one of the models discussed above.

Also, the location of the tool of the earthworks machine in the earthworks construction site is determined. The location of the tool of the earthworks machine may for example be determined by utilizing the satellite-based positioning system and/or at least one tracking device, as discussed above. Furthermore, the location of the tool of the earthworks machine in the earthworks information model is also determined. The determined location of the tool of the earthworks machine in the earthworks construction site provides an indication about the actual location of the tool in the construction site, providing thereby the piece of location information which indicates the location of the tool of the earthworks machine in the earthworks information model.

In the method, the work task in the construction site for the earthworks machine is also determined. It is determined from the earthworks information model. It may be determined, for example, by the operator of the earthworks machine. Alternatively, it may be determined for the operator by, for example, a supervisor of the operator or the work management. The work task could be determined by the server of the earthworks construction site, since the location of the earthworks machine is known and also the next work task to be worked on at that location may be retrieved from the data gathered from the earthworks construction site regarding a completion rate in that location of the earthworks construction site. Alternatively, the work task could be determined such that the server suggests all the work tasks that could be carried out nearby by respective earthworks machine and the operator, the supervisor or the work management determines which work task will be selected as the work task for the earthworks machine to be worked on next.

As said above, the work task is an operation or a set of operations that the earthworks machine should execute or carry out at a specific location at the construction site for advancing a completion of the construction site. The operation may include for example a specific handling to be subjected to the material being located or to be located at a specific area to be worked on, such as a scoop of soil to be removed from the construction site away from the area to be worked on, or a scoop of gravel to be laid to the construction site on the area to be worked on. When the work task for the earthworks machine has been determined, for example the area to be worked on may be determined based on the determined work task and the current location of the earthworks machine. The determined work task covers one or more areas to be worked on, or one or more area units in the area to be worked on or one or more layers in the area to be worked on and represents one or more operations to be carried out therein. Depending on the work task, the area to be worked on or an area unit in an area to be worked on represents one or more location specific parts of the determined work task.

The determined work task is a work task determined in an earthworks information model of the earthworks construction site. The earthworks information model is thus configured to comprise, i.e., to include specific work tasks that are needed to be carried out to complete the construction site or some specific layer or area thereof. When the earthworks machine operates in the construction site for its part to complete the construction site or some specific layer or area thereof, the earthworks machine is intended to follow a working plan determined in the earthworks information model. As said above, since the location of the tool of the earthworks machine is known in the construction site 1, the location of the tool of the earthworks machine can be determined in the earthworks information model. Based at least in part on the location of the tool of the earthworks machine in the earthworks information model, a location specific part of the determined work task in the construction site is further determined. Herein, the location specific part of the determined work task refers to the at least one operation to be carried out at a specific location relating to the determined work task for that specific location. The specific location may refer alternatively to a specific area to be worked on, a specific area unit in the specific area to be worked on, a specific layer in the specific area to be worked on, or a specific layer in the specific area unit in the specific area to be worked on, depending on the accuracy of the description of the work task and/or an intended location specific accuracy of the location specific as-built performance value.

Regarding to accurately determine the location specific part of the determined work task to be worked on, there are several ways. The operator may teach a control system, such as the control unit 12, by pointing out the area or area unit using some input device or arrangement. It is possible to determine the location specific part, i.e., the area or area unit of the determined work task to be worked on by discovering the work phase either by teaching the control system, such as the control unit 12, or by discovering the work phase automatically. Since the work task being carried out by the earthworks machine is known, the area to be worked on is known. If in a work phase the tool of the earthworks machine visits an area outside the area to be worked on, the work phase in that visit outside is, regarding to the determined work task, either discarding mass volume or picking up mass volume and the other end of the work phase relates to the location specific part of the determined work task. For determining the location specific part, i.e., the area or area unit, there may be some other known technique or a combination of the techniques.

Furthermore, at least one of emissions, energy consumption, or elapsed time associated with the location specific part of the determined work task in the construction site is obtained from the earthworks machine as the location specific as-built performance value. Herein emissions and/or energy consumption and/or elapsed time regarding to carrying out operations associated with the said location specific part of the determined work task at the specific location in the construction site is/are determined. When the specific location corresponding to the determined location of the tool of the earthworks machine is known, and when the realized emissions and/or energy consumption and/or elapsed time associated with that specific location for the location specific part of the determined work task is/are known, the location specific as-built performance value can be obtained.

According to an embodiment, a work phase of the work task being carried out can be identified based on information received from a sensor arrangement and control commands as executed by the control unit 12 of the earthworks machine, and based on the location of the tool of the earthworks machine in the earthworks construction site, the identified work phase and the work operations needed to be carried out for completing the construction site or some specific layer or some specific area of some specific layer, the area to be worked on can be determined. The sensor arrangement discussed herein refers for example to pressure sensors, inertial measurement units and other sensors applied in earthworks machines for indicating a position, orientation and/or movement of machine parts supporting the tool.

Thus, the data of the location specific part of the determined work task obtained from the earthworks machine regarding at least one of: emissions, energy consumption or elapsed time may be connected to the location specific part of the determined work task in the earthworks information model.

The location specific as-built performance value regarding to the emissions and/or energy consumption and/or elapsed time associated with the location specific part of the determined work task provides a measure or a value or an indication about the efficiency of the working method(s) or way(s) applied for carrying out the location specific part of the determined work task associated with the specific location in the construction site. The smaller the realized emissions and/or energy consumption and/or elapsed time, the higher the efficiency of the working method(s) or way(s) applied for the location specific part of the determined work task. The location specific as-built performance value may for example be a numerical value that represents, regarding the location specific part of the determined work task, a relationship, or some other dependency between the realized at least one of the emissions, energy consumption or elapsed time associated with the location specific part of the determined work task and a mass volume of a processed material or a surface area of a completed area, for instance.

According to an embodiment, the realized emissions and/or energy consumption and/or elapsed time associated with the location specific part of the determined work task may be presented as one, two or three separate location specific as-built performance values or as a single combined location specific as-built performance value. The single location specific as-built performance value may be a direct or a weighted combination of some kind of the realized emissions and/or energy consumption and/or elapsed time.

An example where a weighted combination could be used is a weighting of elapsed time and emissions. If a large excavator uses some specific time and some specific emissions to carry out the location specific part of the determined work task, the same location specific part of the determined work task would be carried out for example in double time and 70% of emissions when done using a smaller excavator. It would then raise a question which one of the excavators to select when planning the future operations. If the work task is deemed critical when planning the schedule of construction site operations, it could be useful to select the large excavator, and if the work task is not critical when planning the schedule of the construction site operations, one could select the smaller excavator for smaller emissions although the elapsed time would be double. Still, the result for which choice to select depends on the work task and how the elapsed time is weighted with respect to the emissions in the work task. In real life there could be a situation wherein, for some reason, the smaller excavator is not available or resides all too far away and, thus, it would be more affordable to select the larger excavator to carry out the work task. Regarding the change in plan there would be difference between predicted emissions and measured emissions as well as there would be difference between predicted elapsed time and measured elapsed time. Further, if the smaller excavator were electric powered and larger excavator were diesel powered, it is wise to consider an energy consumption as well and have some weight for it too with respect to the emissions and elapsed time. Still further, if the contract for the earthworks construction site contains an emissions limit and time limit, the emissions might have the highest weight in case the work task is not critical regarding the schedule and therefore it could be most affordable to select an electric powered smaller excavator to carry out the work task.

According to an embodiment, the emissions may refer to for example carbon dioxide emissions or nitrogen emissions or both. Emission per used fuel per earthworks machine may be measured in advance from exhaust gases and thereafter measured from the amount of fuel used per earthworks machine. Such emissions that have requirements in the contract may be by some means measured. In some cases, one may need to predict some emissions for example from energy consumption such as diesel or electricity used.

According to an embodiment, the energy consumption may refer to a measured electrical energy and/or fuel consumption of the earthworks machine, or to a calculated electrical energy and/or fuel consumption of the earthworks machine based on power used by the earthworks machine.

According to an embodiment, the elapsed time may refer to a working time used as measured for example by an operating hour meter or operating time meter of the earthworks machine. Alternatively, or additionally, the elapsed time regarding each location specific part of the determined work task may be concluded from a work cycle of the earthworks machine and location of the tool in respective parts of the work cycle in the time the earthworks machine is operational.

The determination of the location of the tool of the earthworks machine in the earthworks construction site may be implemented in various ways as well as determining the work cycle.

According to an embodiment for determining the location of the tool in the construction site and in the earthworks information model, the operator of the earthworks machine may specify in the earthworks information model that is applied during carrying out the work that the tool locates at a specific location for example by touching the respective specific area to be worked on, respective area unit in the area to be worked on, or a specific layer in at least either of them.

According to an embodiment for determining the location of the tool in the construction site, a location and an orientation of the earthworks machine in the construction site are determined for example in a construction site coordinate system CSCS, and furthermore a location of the tool of the earthworks machine in a machine coordinate system MCS is determined. The construction site coordinate system CSCS may be fixed to some stationary, unmovable object in the construction site. The machine coordinate system MCS may be fixed to some specific point in the earthworks machine. The construction site coordinate system CSCS and the machine coordinate system MCS are shown schematically in FIG. 1. When the location of the tool is known in the machine coordinate system MCS, the location of the tool in the construction site is known based on the dependency between the construction site coordinate system CSCS and the machine coordinate system MCS, whereby the location of the tool may be associated with the specific area to be worked on in the construction site, with the specific area unit in the area to be worked on, or in the specific layer in at least either of them. The location of the tool in the construction site indicates the location of the tool in the earthworks information model. Likewise, when the location of the tool in the construction site is known, the operator may teach the work cycle to the machine such that the operator inputs by some means in the work cycle the location that is to be worked on. These input means could be a button, voice command, touching of respective area in the representation of the construction site in the earthworks information model or a map of any kind.

According to an embodiment, the location and orientation of the earthworks machine in the construction site may be determined by utilizing the satellite-based positioning system GNSS (Global Navigation Satellite Systems).

According to an embodiment, the location and orientation of the earthworks machine in the construction site may be determined by at least one device having a known or derivable location at the construction site 1 in the construction site coordinate system CSCS, which device is capable for tracking either alone or in combination with at least one other device the location and orientation of the earthworks machine in the construction site 1. Examples of that kind of devices are a camera, a stereocamera, a lidar, a radar and a tachymeter. To know or derive a location of such device, for example, the satellite-based positioning and/or detectable markers known in the construction site coordinate system CSCS may be used.

According to an embodiment, after the location and orientation of the earthworks machine in the construction site is determined, the location of the tool of the earthworks machine may be determined by determining the location of the tool of the earthworks machine in the machine coordinate system MCS for example by a sensor arrangement indicating a position and an orientation of machine parts supporting the tool.

According to an embodiment for determining the location of the tool in the construction site, the location of the tool in the construction site is determined by at least one device having a known location at the construction site 1 in the construction site coordinate system CSCS and being configured to track either alone or in combination with at least one other device the location of the tool of the earthworks machine in the construction site 1. Alternatively, the location of the earthworks machine in the construction site 1 is tracked and thereafter the location of the tool of the earthworks machine is determined using the sensor arrangement indicating the position and orientation of the machine parts supporting the tool. The determined location of the tool in the construction site 1 may then be associated with the specific area to be worked on, with the specific area unit, or with the specific layer in at least either of them in the construction site 1 and in the earthworks information model.

According to an embodiment, the method further comprises determining an orientation of the tool of the earthworks machine in at least one degree of freedom, wherein determining the location specific part of the determined work task in the construction site is further based at least in part on the at least one degree of freedom of the tool of the earthworks machine.

According to this embodiment, the orientation of the tool in the construction site 1 is thus determined in at least one degree of freedom and the selection of which degree of freedom to use regarding each tool would be the one most useful degree of freedom for the work task in question, for example, the degree of freedom aiding in determining the work cycle and/or the location specific part of the determined work task in the construction site. For example, it may be determined with aid of the changes of a pitch angle of the bucket 8 of the excavator or the wheel loader whether it is able to carry material or not. Some earthworks machines, such as more advanced excavators may have three different degrees of freedom to turn the bucket 8, the bucket 8 having thereby three possible different orientation directions, such as roll, pitch and yaw. However, the orientation of some tools, such as the drum in the drum roller, may be altered in only one direction.

The determination of the orientation of the tool of the earthworks machine may further improve the accuracy of the determined location of the tool in such a way that the orientation of the tool is the decisive factor for determining for example the area to be worked on, the area unit of the area to be worked on, or some specific layer in at least either of them that is subjected to the work task implemented by the earthworks machine. For example, although the location of the tool is determined to be in some area unit of the area to be worked on, knowing the orientation of the tool may actually cause a decision that the work task is carried out in another area unit of the area to be worked on. Further, the orientation of the tool helps to determine the location of the tool such that it may be determined which area of the tool is actually working, since in the bucket 8, for example, the area of the tool actually working may be the tool tip or the whole bottom area of the bucket 8 or a side of a bucket. Thereby, determining the location specific part of the determined work task in the construction site is further based at least in part on the at least one degree of freedom of the tool of the earthworks machine.

According to an embodiment, the determination of the location of the tool of the earthworks machine comprises determining the three-dimensional location and orientation of the tool, i.e., determining the location and orientation of the tool in six degrees of freedom (6DOF), wherein determining the location specific part of the determined work task in the construction site is based at least in part on the three-dimensional location and orientation of the tool of the earthworks machine. According to this embodiment, the location and orientation of the tool in the construction site 1 is determined in three dimensions, whereby the location and orientation of the tool is determined in a horizontal direction, in a vertical direction and in a direction that is perpendicular both to the horizontal direction and vertical direction, whereby the determination of the location specific part of the determined work task in the construction site is based at least in part on the three-dimensional location and orientation of the tool of the earthworks machine. This improves the accuracy of the determined location and orientation of the tool so that for example in a horizontal level the location of the tool may be associated with a specific area unit of a specific area to be worked on in the construction site 1, and in a vertical level the location of the tool may be associated with a specific layer in the above-mentioned specific area unit of the specific area to be worked on in the construction site 1.

When the location of the tool of the earthworks machine is determined in the said three dimensions, i.e., in six degrees of freedom, a point, line or area of the tool the location of which is to be determined may be selectable by an operator of the earthworks machine, or it may be a tool-specific predetermined point, line or area in the tool. In an excavator and wheel loader the said point may for example be a central point in a tip of the bucket 8, the said line may correspond with the location of the tip of the bucket or the said area may correspond with the area of the bottom of the bucket 8. In a dumper or other earthworks transport machine the said point may be a central point in a tip of a rear end of a platform, or the said line may correspond to the rear end of the platform. In a drum roller the said point may be a central point of a drum or the said line may be a line having width of the drum and corresponding to the lowest part of the drum. In compacting soil using flat compacting device like soil compaction plate the said area of the tool may be the area of the compaction plate. In a surface drill rig the said point may be an end tip of the drill bit.

According to an embodiment, the method further comprises determining at least one feature of the tool of the earthworks machine, wherein the at least one feature of the tool of the earthworks machine is at least one of: weight, width, height, maximum length/extend, capacity, volume, amplitude, diameter, wear out, service life, manufacturing material, or predefined service life. Thus, according to this embodiment, either only one single feature of the listed features of the tool of the earthworks machine is determined, or two or more features of the listed features of the tool of the earthworks machine are determined. Regarding which one, two or more features is/are determined depends on the case and may thus be selected on a case-by-case basis. The said at least one feature of the tool of the earthworks machine may be utilized when evaluating the data regarding the emissions, energy consumption and/or elapsed time associated with the area to be worked on. Moreover, the data may be compared with other respective data. The other respective data may be for example similar work task carried out by some other operator having the same feature or having a different feature. Likewise, it may be compared with similar work task by the same operator by differently featured earthworks machine, i.e., smaller, or larger earthworks machine and/or an earthworks machine having different energy source.

The weight, width, height, maximum length/extend, capacity, volume, amplitude and diameter of the tool of the earthworks machine relate to different dimensions of the tool of the earthworks machine, which provide direct measures for a determination of an efficiency of the tool of the earthworks machine in view of the caused emissions or energy consumption, or the elapsed time used to carry out the intended operation(s). For example, if an excavator is large and the area to be dug is large, the larger the size of a bucket of the excavator, the shorter is the elapsed time used to complete a digging operation but the higher the emissions or energy consumption of a single bucket movement. The listed features may also be used to determine at least an estimate for the at least one of the emissions, energy consumption, or elapsed time regarding to carry out the intended operation in case of other means to directly measure or calculate the at least one of the emissions, energy consumption, or elapsed time not being available. Also history data regarding to the use of a specific tool type for carrying out a specific work task may be applied herein. It should be noted that the more other respective data to compare with the better results may be achieved in view of choosing working methods and making estimations.

The wear out, service life, manufacturing material, and predetermined service life of the tool of the earthworks machine relate to different characteristics of the tool of the earthworks machine, which at least indirectly relate to an efficiency of the tool of the earthworks machine. The higher the wear out or service life already used, or the lower the predetermined service life still available, the lower the expected efficiency of the tool used. The manufacturing material of the tool, in turn, may have an effect of increasing or decreasing the wear out of the tool or an expected service life of the tool as well as it may have an effect of increasing or decreasing the emissions, energy consumption and/or elapsed time if it is a question of a manufacturing material of for example a drill bit.

According to an embodiment, the method further comprises determining at least one feature of the earthworks machine, wherein the at least one feature of the earthworks machine is at least one of: weight, width, height, torque, maximum power, wear out of an essential wear part of the machine, service life of an essential wear part of the machine, manufacturing material of an essential wear part of the machine, predetermined service life of the machine, length of at least one boom part, track model, track wear out, wheel model, or wheel wear out. Thus, according to this embodiment, either only one single feature of the listed features of the earthworks machine is determined, or two or more features of the listed features of the earthworks machine are determined. Regarding which one, two or more features is/are determined depends on the case and may thus be selected on a case-by-case basis. The said at least one feature of the earthworks machine may be utilized when evaluating the data regarding the emissions, energy consumption or elapsed time associated with the area to be worked on. Moreover, the data may be compared with other respective data. The other respective data may be for example similar work task carried out by some other operator having the same feature or having a different feature. Likewise, it may be compared with similar work task by the same operator by differently featured tool of the earthworks machine like discussed earlier.

The weight, width, height, torque, maximum power, track model, track wear out, wheel model or wheel wear out relate to different dimensions of the earthworks machine or to a usability of the earthworks machine in the construction site in question relating to maneuverability of the earthworks machine in the intended construction site, the said listed features providing direct measures for a determination of an efficiency of the earthworks machine in view of the caused emissions or energy consumption, or the elapsed time used to carry out the intended operation(s). For example, if the area to be worked on is quite small because of nearby obstacles and an earthworks machine selected is large it may take more emissions, energy and elapsed time when trying to cope with the large earthworks machine. The same listed features may also be used to determine at least an estimate for at least one of the emissions, energy consumption, or elapsed time regarding to carrying out the intended operation in case of other means to directly measure or calculate the at least one of the emissions, energy consumption, or elapsed time not being available. Also history data regarding to the use of a specific earthworks machine type for carrying out a specific work task may be applied herein. It should be noted that the more other respective data to compare with the better results may be achieved in view of choosing working methods and making estimations.

The wear out of an essential wear part of the machine, service life of an essential wear part of the machine, manufacturing material of an essential wear part of the machine, predetermined service life of the machine and length of at least one boom part relate to different characteristics of the earthworks machine, which at least indirectly relate to an operational efficiency of the earthworks machine. An example of an essential wear part is a platform structure, and most essentially the structure that transforms forces to the surface of the ground, i.e., wheels or tracks. The wear in tracs can cause the machine to slip more easily and thus causing the machine to use excessive fuel and time to move during the work. Another example of an essential wear parts are joints in the boom structure. An example of a manufacturing material of an essential wear part is the quality of steel used in such wear part. The steel quality may be essential regarding the service life and wear out of the wear part, for example. The poorer the quality of steel the sooner the machine is serviced again. The higher the wear out or service life already used, or the lower the predetermined service life still available, the lower the expected operational efficiency of the earthworks machine itself. The manufacturing material of the essential wear part of the machine, in turn, may have an effect of increasing or decreasing the wear out of the essential wear part of the machine or an expected service life of the essential wear part of the machine.

According to an embodiment, the method comprises obtaining, from the earthworks machine, a plurality of the at least one of: emissions, energy consumption or elapsed time associated with the location specific part of the determined work task in the construction site, and determining a total amount of the plurality of the at least one of: emissions, energy consumption or elapsed time obtained from the earthworks machine and associated with the location specific part of the determined work task in the construction site.

According to this embodiment, several separately determined measures or values or other indications for emissions, energy consumption and/or elapsed time are associated with the location specific part of the determined work task. These measures or values or indications relates thereby to the area, area unit, or a specific layer in at least either of them where the operations were needed to carry out the work task and the measures or values or indications were obtained from the earthworks machine. Furthermore, based on the several separately determined measures or values or other indications for emissions, energy consumption and/or elapsed time associated with the location specific part of the determined work task, a total amount of the plurality of the emissions, energy consumption and/or elapsed time is determined and associated with the location specific part of the determined work task. In other words, to be said shortly, in this embodiment the data or information of the total amount of emissions, energy consumption and/or elapsed time associated with the location specific part of the determined work task where the earthworks machine worked is obtained from the single earthworks machine in question.

According to an embodiment, the method further comprises completing, by the earthworks machine, the location specific part of the determined work task in the construction site, and determining an amount of the at least one of: emissions, energy consumption or elapsed time associated with the completed location specific part of the determined work task in the construction site from all the obtained at least one of: emissions, energy consumption or elapsed time associated with the location specific part of the determined work task in the construction site to complete the location specific part of the determined work task in the construction site.

According to this embodiment, the amount of the at least one of: emissions, energy consumption or elapsed time associated with the completed location specific part of the determined work task in the construction site, or in other words, a completion amount of the at least one of: emissions, energy consumption or elapsed time associated with the completed location specific part of the determined work task in the construction site is determined after the location specific part of the determined work task has been completed. The determination is based on all the obtained at least one of: emissions, energy consumption or elapsed time associated with the location specific part of the determined work task in the construction site required to complete the location specific part of the determined work task in the construction site, whereby at least one of: emissions, energy consumption or elapsed time associated with the location specific part of the determined work task are collected from all the earthworks machines having been involved to complete the location specific part of the determined work.

According to an embodiment, the method further comprises determining, respectively, a default amount of at least one of: emissions, energy consumption or elapsed time for completing a location specific part of the determined work task in the construction site, and determining an overall efficiency for the location specific part of the determined work task in the construction site by comparing the amount of the at least one of: emissions, energy consumption or elapsed time associated with the completed location specific part of the determined work task in the construction site to the default amount of the at least one of: emissions, energy consumption or elapsed time for completing the location specific part of the determined work task in the construction site.

According to this embodiment, a default amount of emissions, energy consumption and/or elapsed time is determined for completing a location specific part of the determined work task in the construction site, i.e., for completing particular area to be worked on, particular area unit in an area to be worked on, or particular layer in at least either of them that relates to the said work task or to a part of the said work task. Thereafter, operations comprised by the location specific part of the determined work task in the construction site, i.e., the operations needed to complete the area to be worked on, the area unit of the area to be worked on, or the layer in at least either of them that relates to the said location specific part of the determined work task or the part of the said work task, are carried out by the earthworks machine for completing the particular area to be worked on, the particular area unit of the area to be worked on, or the layer in at least either of them. Thereafter, the overall efficiency of the emissions, energy consumption and/or elapsed time is determined for the location specific part of the determined work task relating to the particular area to be worked on, particular area unit of the area to be worked, or the particular layer in at least either of them by comparing the amount of the at least one of: emissions, energy consumption or elapsed time associated with the completed location specific part of the determined work task in the construction site to the default amount of the emissions, energy consumption and/or elapsed time. In this embodiment, the overall efficiency for the location specific part of the determined work task in the earthworks construction site is based on the determined default amount of the emissions, energy consumption and/or elapsed time for the location specific part of the determined work task. According to an embodiment, the default amount for the at least one of: emissions, energy consumption or elapsed time associated with the completed location specific part of the determined work task in the construction site may be an estimated value based for example on mass volumes of materials to be processed and/or moved to complete the location specific part of the determined work task. Alternatively, the default amount may have been taken for example from an earlier similar work task carried out by the same or some other operator having same tool and same earthworks machine or having differently featured tool and/or differently featured earthworks machine or the average of all similar work tasks.

According to an embodiment, the default amount of at least one of: emissions, energy consumption or elapsed time for completing the location specific part of the determined work task in the construction site is an average amount for the same work task by at least one of: similar earthworks machine or a different earthworks machine.

According to this embodiment, the default amount of emissions, energy consumption or elapsed time for completing the location specific part of the determined work task is based on collected history data of a number of work tasks comprising substantially similar operations having been carried out by the earthworks machine that was used earlier to complete one or more earlier areas to be worked on, one or more earlier area units of an area or areas to be worked on, or one or more earlier layers in at least either of them. The one or more earlier work tasks may have been carried out by the one and same earthworks machine or by different earthworks machines.

The said average amount may refer to a straight average of the emissions, energy consumption and/or elapsed time without taking into account the similarity or differences of the earthworks machines involved to complete the earlier work tasks where the said emissions, energy consumption and/or elapsed time relate to. Alternatively, the average amount may be a weighted average of the emissions, energy consumption and/or elapsed time taking also into account the divergence in the characteristics or features of the earthworks machines involved to complete the earlier work tasks. This kind of embodiment is useful when trying to find more efficient working methods from new solutions, such as a new electrically powered earthworks machine compared with earlier diesel-powered machines or a new tool compared with earlier tools.

When the said average amount of the emissions, energy consumption and/or elapsed time relating to the location specific part of the determined work task is determined, a determinant for the determination of the said average amount may also be the similarity or differences of the operations having been carried out to complete the relating work tasks, without taking into account any differences in soil conditions and/or in environmental conditions, such as in prevailing weather conditions, between the different work tasks to be taken into account in the said average determination. Alternatively, a more accurate division of the work tasks to be considered in the determination of the average amount of emissions, energy consumption and/or elapsed time may be applied, whereby in the determination of the said average amount only the work tasks which have been carried out on similar soil conditions and/or environmental conditions are taken into account. According to an embodiment, the method comprises determining from the earthworks information model a mass volume to be moved to complete the location specific part of the determined work task in the construction site, and determining a mass efficiency for the location specific part of the determined work task in the construction site by comparing the mass volume to be moved to complete the location specific part of the determined work task in the construction site to the amount of the at least one of: emissions, energy consumption or elapsed time associated with the completed location specific part of the determined work task in the construction site.

According to this embodiment, the mass volume to be moved per each area to be worked on AW or area unit AU of each area to be worked on AW is defined in the determined work task. The mass volume to be moved per the area to be worked on AW or the area unit AU in the area to be worked on AW may refer to, depending on the situation, either to material mass volume to be removed from the area to be worked on AW or from the area unit AU in question, or to material mass volume to be moved to the area to be worked on AW or to the area unit AU in question. Each area to be worked on AW, or each area unit AU of each area to be worked on AW, or even each layer in at least either of them may represent the respective location specific part of the determined work task whereby the mass efficiency, i.e., an efficiency for moving of the material, may be determined by comparing the mass volume to be moved to complete the location specific part of the determined work task in the construction site to the amount of the at least one of: emissions, energy consumption or elapsed time associated with the completed location specific part of the determined work task.

According to an embodiment, the method further comprises completing a plurality of location specific parts of the determined work task in the construction site, determining from the earthworks information model a mass volume to be moved for each of the plurality of location specific parts of the determined work task in the construction site, and determining a completion rate of the determined work task in the construction site by comparing the total mass volume moved regarding the plurality of the completed location specific parts of the determined work task in the construction site to the mass volume to be moved to complete all the location specific parts of the work task in the construction site.

In this embodiment a mass volume to be moved to complete the work task, i.e., for each of the plurality of the location specific parts of the determined work task, is thus determined from the earthworks information model for each of the plurality of the location specific parts of the determined work task in the construction site. The determined mass volume to be moved may refer to the masses that are removed away from the construction site or at least away from the particular area to be worked on or away from the particular area unit of the area to be worked on to which the work task relates, or masses to be moved to the particular area to be worked on or to the particular area unit of the area to be worked on to which the work task relates, or both of them. The mass volume to be moved to complete the work task may also be determined on-site during the progress of the construction site. This may be suitable for situations where changes in plans are made for some reason. The determined mass volume may be re-determined as the work progresses if there is a way to verify the correct mass volume moved and it differs from the earlier determined amount. Furthermore, according to an alternative, the mass volume to be moved to complete the work task may be determined as a default value that is determined based on corresponding work tasks that have been carried out in previously completed construction sites. This alternative way may be suitable for such work tasks or parts thereof where the earthworks information model does not specify a certain thickness, like removing soil from the construction site.

Furthermore, this embodiment comprises determining the total mass volume moved by the earthworks machine by determining the total mass volume moved regarding the completed location specific parts of the determined work task. The earthworks machine keeps the record of the mass volumes moved regarding the individual completed areas to be worked or area units therein that correspond the completed location specific parts of the determined work task. Based on the total mass volume moved regarding the individual completed location specific parts of the determined work task, the total mass volume moved by the earthworks machine may be determined. In response to the determined total mass volume moved by the earthworks machine, the percentage of the determined work task completed by the earthworks machine may be determined by comparing the total mass volume moved regarding the plurality of the completed location specific parts of the determined work task in the construction site to the mass volume to be moved to complete all the location specific parts of the work task in the construction site, which indicates the degree of the readiness of the determined work task in the construction site.

According to an embodiment, the earthworks machine is a first earthworks machine and the method further comprises obtaining, from at least one second earthworks machine, respectively, at least one of: emissions, energy consumption or elapsed time associated with the location specific part of the determined work task in the construction site of the first earthworks machine.

According to this embodiment, there are at least two earthworks machines, i.e., the first earthworks machine and the second earthworks machine, that take part in to carry out necessary operations to complete the work task regarding to the location specific part of the determined work task of the first earthworks machine, i.e., to carry out the necessary operations to complete the work task regarding to the area to be worked on or the area unit in the area to be worked on wherein the first earthworks machine operates. In this embodiment, the emissions, energy consumption or elapsed time associated with the location specific part of the determined work task relating to the operation of the first earthworks machine is determined. Additionally, respectively, the emissions, energy consumption or elapsed time associated with the same location specific part of the determined work task relating to the operation(s) of at least one another earthworks machine that takes part in to carry out the operations needed to complete the work task is determined. Some examples of the at least one second earthworks machine are an earthworks transport machine, a machine used to load to the earthworks transport machine material to be transported away from the area to be worked on or from some area unit therein, or to load to the earthworks transport machine material to be transported to the area to be worked on or to some area unit therein, or a machine used to quarry and/or crush material to be transported to the area to be worked on or to some area unit therein. Regarding the example where the second earthworks machine is the earthworks transport machine that transports away the material that the first earthworks machine digs and loads to this second earthworks machine, the first earthworks machine keeps track the location specific areas wherefrom the material was dug to each load. When the second earthworks machine carried out its work cycle to transport the said material away, the respective emissions, energy consumption and/or elapsed time of the work cycle are obtained from the second earthworks machine and associated with the correct location specific part(s) of the determined work task of the first earthworks machine. According to a further embodiment of the embodiment like that discussed just above, the at least one second earthworks machine is an earthworks transport machine and the at least one of: emissions, energy consumption or elapsed time associated with the location specific part of the determined work task in the construction site of the first earthworks machine regarding the second earthworks machine further contains, respectively, at least one of: emissions, energy consumption or elapsed time regarding the transported material.

According to this embodiment, the at least one second earthworks machine is an earthworks transport machine, and the respective at least one of: emissions, energy consumption or elapsed time associated with the second earthworks machine further contains respective at least one of: emissions, energy consumption or elapsed time regarding the transported material. According to this embodiment respective emissions, energy consumption and/or elapsed time associated with the material that is transported by the earthworks transport machine are also considered when the respective emissions, energy consumption and/or elapsed time associated with the location specific part of the determined work task is/are determined. This means for example that the respective emissions, energy consumption and/or elapsed time used for manufacturing, such as used for quarrying and/or crushing, as well as the emissions, energy consumption and/or elapsed time used for loading the said material to the earthworks transport machine are associated to said material to be transported by the earthworks transport machine. In response to the transportation of the said material, the emissions, energy consumption and/or elapsed time having been associated with the said material is to be included in the emissions, energy consumption and/or elapsed time associated with the earthworks transport machine, which emissions, energy consumption and/or elapsed time were caused due to the transportation of the said material to the area to be worked on or to some specific area unit therein. In response to the said material having been transported to the area to be worked on or to some specific area unit therein, the emissions, energy consumption and/or elapsed time associated with the earthworks transport machine, now including also the emissions, energy consumption and/or elapsed time regarding to the manufacturing and loading of said material, may further be associated with the emissions, energy consumption and/or elapsed time associated with the earthworks machine operating on the said area to be worked on or on some specific area unit therein, and, at the end, may further be associated with the emissions, energy consumption and/or elapsed time associated with the said area to be worked on or with some specific area unit therein. The emissions, energy consumption and/or elapsed time associated with the said area to be worked on or with some specific area unit therein now represents the total emissions, energy consumption and/or elapsed time of the work done regarding the work task carried out by the first earthworks machine for the said area to be worked on or some specific area unit therein, depending on the extent of the area regarding to the location specific part of the determined work task. Likewise, the first earthworks machine that uses the material transported to the area to be worked on or to some specific area unit therein, keeps track of the location specific area(s) where the transported material ends up and thereafter the correct location specific area(s) for the respective emissions, energy consumption and/or elapsed time obtained from the earthworks transport machine regarding the material transported are associated with correct location specific area(s) to be worked on or are unit(s) therein.

The example above describes the determination of the total emissions, energy consumption and/or elapsed time regarding to the area to be worked on in case when new material is transported to the area to be worked on. In case when some material is removed from the area to be worked on, there may be at least two alternatives for the determination of the total emissions, energy consumption and/or elapsed time regarding to the said area to be worked on. In case of the material to be removed being reused at some other area to be worked on, the emissions, energy consumption and/or elapsed time associated with the material removed from an area to be worked on may be reduced from the total emissions, energy consumption and/or elapsed time regarding to the said area to be worked on wherefrom the material is removed, i.e., thereby, from the respective location specific part of the determined work task, and to be included in the total emissions, energy consumption and/or elapsed time regarding to an area to be worked on that receives the said material, i.e., thereby, to the respective location specific part of the determined work task. In case of the material to be removed not being suitable for being reused but must be destroyed or rejected, the emissions, energy consumption and/or elapsed time associated with the material removed from an area to be worked on may be included in the total emissions, energy consumption and/or elapsed time regarding to the said area to be worked on wherefrom the material is removed, i.e., thereby, to the respective location specific part of the determined work task.

According to an embodiment, the method further comprises determining at least one portion of the earthworks machine related to moving the tool of the earthworks machine, determining at least one of: acceleration data or angular velocity data for the movement of the at least one portion of the earthworks machine for the location specific part of the determined work task in the construction site, calculating a movement difference value for the at least one of: acceleration data or angular velocity data for the location specific part of the determined work task in the construction site, and determining a performance factor from the movement difference value to the location specific part of the determined work task in the construction site.

In this embodiment at least one portion of the earthworks machine related to the moving of the tool of the earthworks machine is determined or selected and the movement, and especially at least one of the acceleration data or angular velocity data of that at least one portion of the earthworks machine is determined when the earthworks machine is carrying out the operations for advancing the progress of the area to be worked on or the area unit therein that regards to the location specific part of the determined work task. A movement difference value for the at least one of: acceleration data or angular velocity data for the location specific part of the determined work task is calculated in view of the at least one of: emissions, energy consumption or elapsed time associated with the location specific part of the determined work task, whereby the performance factor, based on the movement difference value representing a dependence between the way to operate the earthworks machine and the respective emissions, energy consumption and/or elapsed time associated with the location specific part of the determined work task, can be determined. The performance factor provides information or data that represents the effect of the way of operating the earthworks machine to the location specific as-built performance value and it may be utilized to further guide the operator of the earthworks machine for operating the machine more efficiently in view of the emissions, energy consumption and/or elapsed time.

According to a further embodiment of the embodiment like that discussed just above, the earthworks machine is an excavator and the at least one portion of the earthworks machine related to moving the tool of the earthworks machine is at least one of the following: a boom part, a joint in a boom structure, an upper carriage of the excavator or an undercarriage of the excavator. By inspecting at least one of the acceleration data or angular velocity data of the at least one said portion of the excavator the performance factor to the location specific part of the determined work task in the construction site may be determined. The more portions inspected the more accurate result, but also the more expensive installation. Thus, on case-by-case basis it may be selected the most suitable portions and suitable number of portions to inspect.

Figure 7:
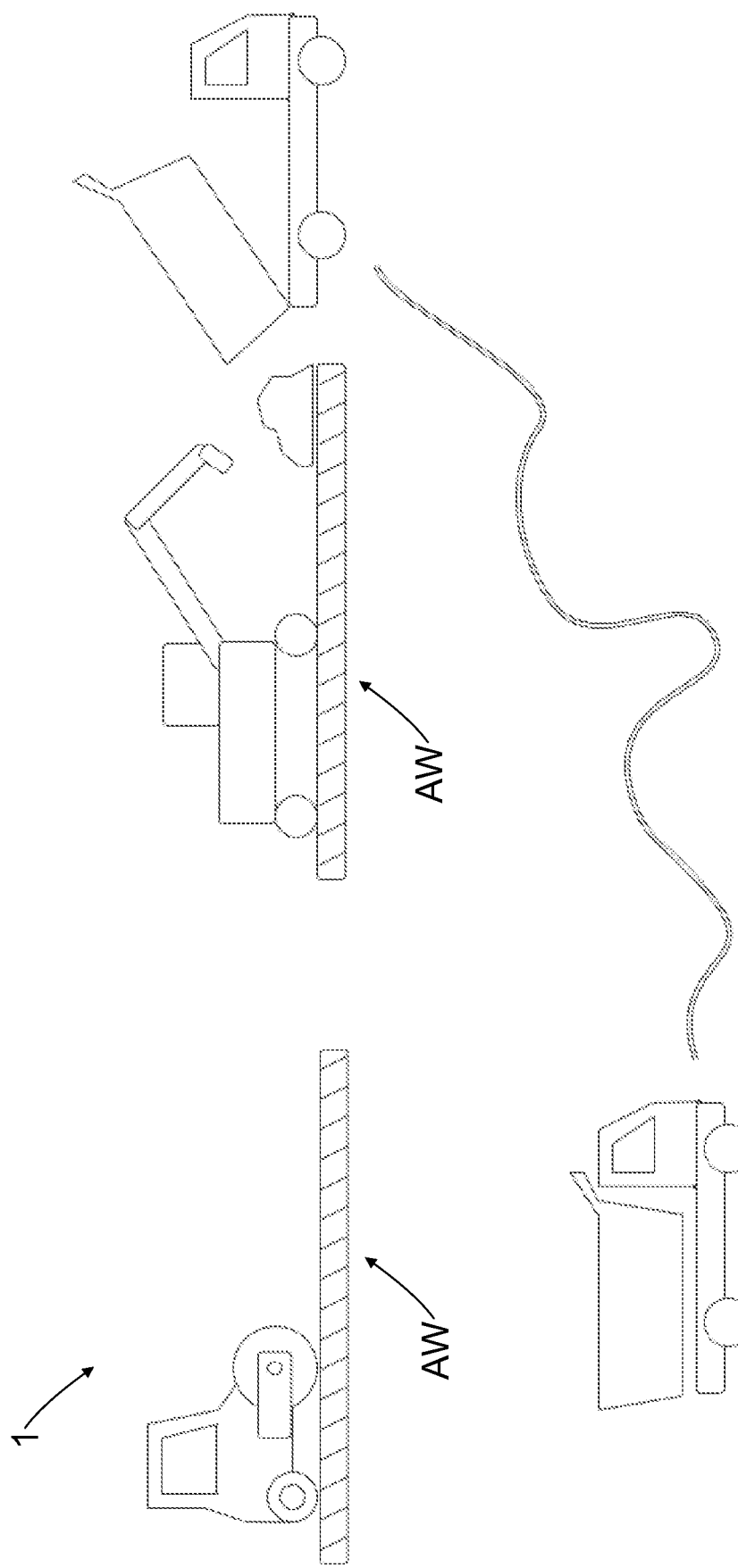
FIG. 7 shows schematically an example of determining a location specific as-built performance value in an earthworks construction site.

FIG. 7 shows schematically an example of determining a location specific efficiency in an earthworks construction site. FIG. 7 shows schematically an earthworks construction site 1, and an area to be worked on AW therein. In the example of FIG. 7 altogether three earthworks machines carry out different operations to complete the construction site 1, the earthworks machines being a lorry to transport some material to the area to be worked on AW, an excavator to level the material onto the area to be worked on AW, and a drum roller for compacting the area to be worked on AW.

In the example of FIG. 7 the lorry transports a pile of material having a mass volume to the area to be worked on AW. At a time of the material having been loaded to the lorry, the material has been associated with the emissions, energy consumption and/or elapsed time due to the loading of the material to the lorry. If the material must have been manufactured in some special way, such as by quarrying and/or crushing, the emissions, energy consumption and/or elapsed time due to this manufacturing of the material are also associated with the emissions, energy consumption and/or elapsed time of the material, i.e., they are add together with the emissions, energy consumption and/or elapsed time caused due to the loading of the material to the lorry. In response to the unloading of the pile of the material from the lorry to the area to be worked on, the emissions, energy consumption and/or elapsed time caused by the transportation and unloading of the material, i.e., the emissions, energy consumption and/or elapsed time caused by the lorry, are also included in the emissions, energy consumption and/or elapsed time of the material previously defined, whereby the total emissions, energy consumption and/or elapsed time of the material including the emissions, energy consumption and/or elapsed time relating to the manufacturing, loading, transportation and unloading of said pile of material may be associated with the pile of material having the known mass volume at the area to be worked on AW. Thus, every cubic meter of material per each pile of material has evenly distributed share of the emissions, energy consumption and/or elapsed time relating to the manufacturing, loading, transportation and unloading of said pile of material.

The excavator is used to level the pile of material having the known mass volume, which means that since the location of the tool of the excavator is known, the area or area unit or each area or each area unit to be worked on is known and the material flow to the area or area unit or each area or each area unit is known. The control system, such as the control unit 12, of the excavator distributes the total emissions, energy consumption and/or elapsed time regarding to the said mass volume of the material to the area to be worked on, or area unit or each area or each area unit, where the excavator levels the pile of material. Levelling the pile of material onto the area or area unit or each area or each area unit to be worked on, causes some emissions, energy consumption and/or elapsed time as well. The respective emissions, energy consumption and/or elapsed time caused by the excavator is/are distributed likewise to the area or area unit or each area or each area unit where the tool of the excavator levels the pile of material and represent the emissions, energy consumption and/or elapsed time associated with the location specific part of the determined work task in the construction site 1.

Alternatively, the emissions, energy consumption and/or elapsed time regarding to the pile of material may be included before levelling in the emissions, energy consumption and/or elapsed time of the excavator that are caused due to the levelling of the said pile of material. Thereafter the total amount of emissions, energy consumption and/or elapsed time of the pile of material and emissions, energy consumption and/or elapsed time regarding to the excavator and caused by the levelling of the pile of material is distributed evenly over the mass volume of the pile of the material and thereafter to the area or area unit or each area or each area unit to be worked on where the mass volume of the pile of material was levelled. In other words, if area unit AU1 required X cubic meters of material and area unit AU2 required 2*X cubic meters of material, the control system, such as the control unit 12, distributes double of emissions, energy consumption and/or elapsed time to the area unit AU2 compared to the area unit AU1.

After the pile of material having been levelled onto the area to be worked on, the drum roller compacts the area to be worked on, whereafter at least that work phase comprising levelling and compaction of the area to be worked on AW of the construction site 1 may be deemed as completed. The emissions, energy consumption and/or elapsed time caused by the drum roller may now be included in the area to be worked on AW. Regarding the compacting work of the drum roller, the emissions, energy consumption and/or elapsed time will be shared with regards to the square meters. Since the location of the tool, i.e., the compacting device of the drum roller is known, the emissions, energy consumption and/or elapsed time of the drum roller may be distributed to the area or area unit or each area or each area unit to be worked on. In other words, in case of the drum roller, it is not the question of mass volume of the material but it is the question of surface area and the emissions, energy consumption and/or elapsed time of the drum roller regarding the area or area unit or each area or each area unit to be worked on, whereby the emissions, energy consumption and/or elapsed time caused by the drum roller are associated to the area or area unit or each area or each area unit to be worked on AW now having been levelled and compacted and represent the emissions, energy consumption and/or elapsed time associated with the location specific part of the determined work task of the drum roller in the construction site 1.

The data regarding the total amount of emissions, energy consumption and/or elapsed time to complete the above-described work phase comprising levelling and compaction in the area to be worked on AW may be gathered to the server of the construction site 1 or a cloud service of the construction site 1, for example. As described, the area to be worked on AW may be divided into area units and the transported material may not be levelled into only one area to be worked on AW but may also be levelled to another area to be worked on AW and the earthworks machine to level the transported material is the machine to share the emissions, energy consumption and/or elapsed time regarding the transported material into the areas to be worked on where the transported material is levelled. The drum roller is an example of an earthworks machine that keeps track on only its own emissions, energy consumption and/or elapsed time, therefore it is easier for its control system to distribute location specifically its emissions, energy consumption and/or elapsed time to the area or area unit or each area or each area unit to be worked on.

Figure 8:
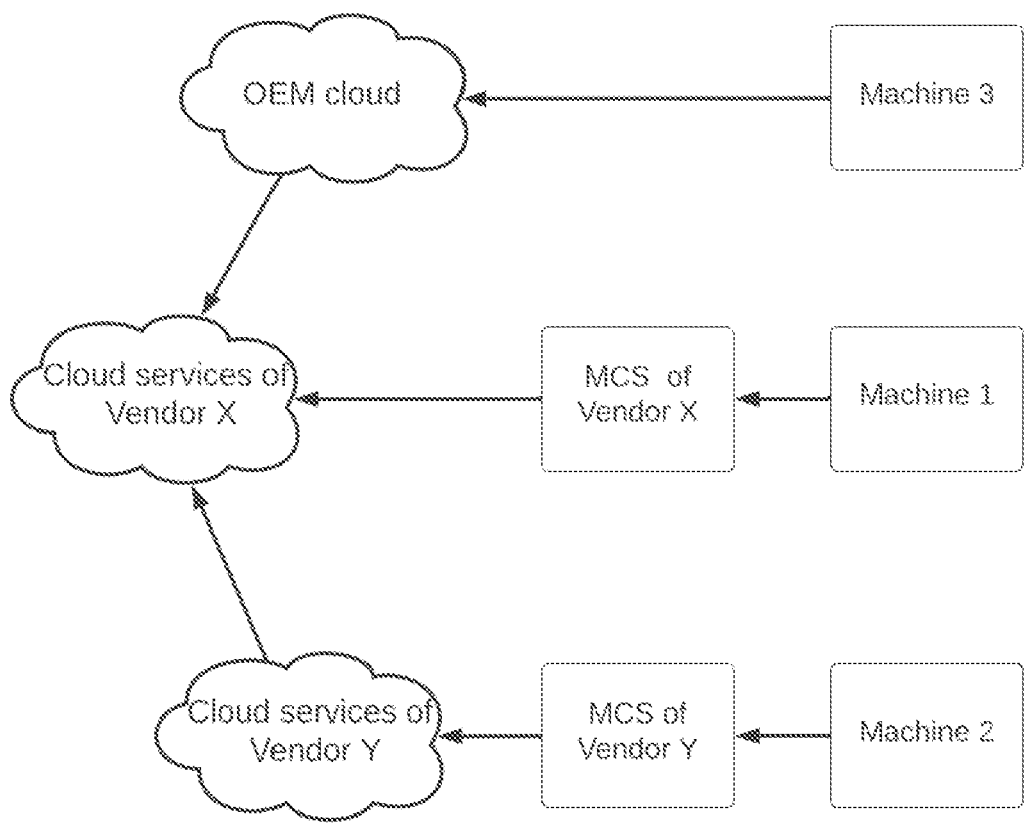
FIG. 8 shows schematically an example of an information flow system applied in determining a location specific as-built performance value in an earthworks construction site.

FIG. 8 shows schematically an example of an information flow system that may be applied in determining a location specific as-built performance value in an earthworks construction site.

FIG. 8 shows a first machine, i.e., "machine 1", that is equipped with a machine control system MCS of a vendor X. Referring to the example of FIG. 7, the first machine may for example be the drum roller. The machine control system of the first machine may be connected to cloud services provided by the same vendor X, whereby the necessary information, such as the emissions, energy consumption and/or elapsed time and the location information of the first machine and/or the tool thereof, such as a compacting device in the drum roller, relating to the operations carried out by the first machine may be transmitted to the cloud services of the vendor X by the respective machine control system MSC of the first machine, the cloud services of the vendor X for example providing herein a server or a cloud service for storing the data related to the construction site 1.

FIG. 8 further shows a second machine, i.e., "machine 2", that is equipped with a machine control system MCS of a vendor Y. Referring to the example of FIG. 7, the second machine may for example be the lorry. The machine control system of the second machine may be connected to cloud services provided by the same vendor Y, whereby the necessary information, such as the emissions, energy consumption and/or elapsed time and the location information of the second machine and/or the tool thereof, such as a platform in the lorry, relating to the operations carried out by the second machine may be transmitted to the cloud services of the vendor Y by the respective machine control system MSC of the second machine and thereafter to the server or a cloud service for storing data related to the construction site 1, for example.

FIG. 8 further shows a third machine, i.e., "machine 3", that, referring to the example of FIG. 7, may for example be the excavator. The third machine may be connected to OEM cloud service provided by the manufacturer of the third machine, whereby the necessary information, such as the emissions, energy consumption and/or elapsed time and the location information of the third machine and/or the tool thereof, such as a bucket of the excavator, relating to the operations carried out by the second machine may be transmitted straight to the cloud service of the manufacturer of the third machine and thereafter to the server or a cloud service for storing data related to the construction site 1, for example.

In the example of FIG. 8 the data or information collected to the cloud services of the vendor Y and the OEM cloud service of the manufacturer of the third machine is further transmitted to the cloud services of the vendor X, i.e., the server or the cloud service for storing data related to the construction site 1, for example, for determining the location specific as-built performance value in the respective earthworks construction site, i.e., such as the efficiency regarding to the area to be worked on AW shown in the example of FIG. 7.

It will be obvious to a person skilled in the art that, as the technology advances, the inventive concept can be implemented in various ways. The invention and its embodiments are not limited to the examples described above but may vary within the scope of the claims.

The invention claimed is:

1. A method for determining an earthworks information model based location specific as-built performance value in an earthworks construction site, the method comprising:
   determining an earthworks information model of the earthworks construction site, wherein the earthworks information model comprises specific work tasks that are needed to be carried out to complete the earthworks construction site or some specific layer or area thereof;
   determining a location of a tool of an earthworks machine in the earthworks construction site and, respectively, in the earthworks information model;
   determining a work task from the specific work tasks that are needed to be carried out to complete the earthworks construction site or some specific layer or area thereof in the earthworks construction site for a control unit of the earthworks machine from the earthworks information model;
   determining for the control unit, based at least in part on the location of the tool of the earthworks machine in the earthworks information model, a location specific part of the determined work task in the earthworks construction site; and
   obtaining by the control unit as the location specific as-built performance value, from the earthworks machine, at least one of: emissions, energy consumption or elapsed time associated with the location specific part of the determined work task in the earthworks construction site.

2. The method according to claim 1, further comprising:
   determining an orientation of the tool of the earthworks machine in at least one degree of freedom, wherein
   determining the location specific part of the determined work task in the earthworks construction site is further based at least in part on the at least one degree of freedom of the tool of the earthworks machine.

3. The method according to claim 1, wherein the determination of the location of the tool of the earthworks machine comprises determining three-dimensional location and orientation of the tool, wherein
   determining the location specific part of the determined work task in the earthworks construction site is based at least in part on the three-dimensional location and orientation of the tool of the earthworks machine.

4. The method according to claim 1, wherein the earthworks information model of the earthworks construction site comprises at least one of: a surface model or geometric model.

5. The method according to claim 1, wherein the earthworks information model is based on at least one of the following: Geospatial Information System (GIS), Building Information Modelling (BIM), Infra or Infrastructure Building Information Modelling (I-BIM), Civil Information Model (CIM), Project Information Model (PIM) or Smart-City Platform.

6. The method according to claim 1, further comprising:
   determining at least one feature of the tool of the earthworks machine, wherein the at least one feature of the tool of the earthworks machine is at least one of the following: weight, width, height, maximum length/extend, capacity, volume, amplitude, diameter, wear out, service life, manufacturing material, or predetermined service life.

7. The method according to claim 1, further comprising:
   determining at least one feature of the earthworks machine, wherein the at least one feature of the earthworks machine is at least one of the following: weight, width, height, torque, maximum power, wear out of an essential wear part of the machine, service life of an essential wear part of the machine, manufacturing material of an essential wear part of the machine, predetermined service life of the machine, length of at least one boom part, track model, track wear out, wheel model, or wheel wear out.

8. The method according to claim 1, further comprising:
   obtaining, from the earthworks machine, a plurality of the at least one of: emissions, energy consumption or elapsed time associated with the location specific part of the determined work task in the earthworks construction site; and
   determining a total amount of the plurality of the at least one of: emissions, energy consumption or elapsed time obtained from the earthworks machine and associated with the location specific part of the determined work task in the earthworks construction site.

9. The method according to claim 8, further comprising:
   completing, by the earthworks machine, the location specific part of the determined work task in the earthworks construction site; and
   determining an amount of the at least one of: emissions, energy consumption or elapsed time associated with the completed location specific part of the determined work task in the earthworks construction site from all the obtained at least one of: emissions, energy consumption or elapsed time associated with the location specific part of the determined work task in the earthworks construction site to complete the location specific part of the determined work task in the earthworks construction site.

10. The method according to claim 9, further comprising:
    determining, respectively, a default amount of at least one of: emissions, energy consumption or elapsed time for completing a location specific part of the determined work task in the earthworks construction site; and
    determining an overall efficiency for the location specific part of the determined work task in the earthworks construction site by comparing the amount of the at least one of: emissions, energy consumption or elapsed time associated with the completed location specific part of the determined work task in the earthworks construction site to the default amount of the at least one of: emissions, energy consumption or elapsed time for completing the location specific part of the determined work task in the earthworks construction site.

11. The method according to claim 9, further comprising:
    determining from the earthworks information model a mass volume to be moved to complete the location specific part of the determined work task in the earthworks construction site; and determining a mass efficiency for the location specific part of the determined work task in the earthworks construction site by comparing the mass volume to be moved to complete the location specific part of the determined work task in the earthworks construction site to the amount of the at least one of: emissions, energy consumption or elapsed time associated with the completed location specific part of the determined work task in the earthworks construction site.

12. The method according to claim 9, further comprising:
completing a plurality of location specific parts of the determined work task in the earthworks construction site;
determining from the earthworks information model a mass volume to be moved for each of the plurality of location specific parts of the determined work task in the earthworks construction site; and
determining a completion rate of the determined work task in the earthworks construction site by comparing the total mass volume moved regarding the plurality of the completed location specific parts of the determined work task in the earthworks construction site to the mass volume to be moved to complete all the location specific parts of the determined work task in the earthworks construction site.

13. The method according to claim 1, wherein the earthworks machine is a first earthworks machine, and the method further comprises:
obtaining, from at least one second earthworks machine, respectively, at least one of: emissions, energy consumption or elapsed time associated with the location specific part of the determined work task in the earthworks construction site of the first earthworks machine.

14. The method according to claim 13, wherein the at least one second earthworks machine is an earthworks transport machine and the at least one of: emissions, energy consumption or elapsed time associated with the location specific part of the determined work task in the earthworks construction site of the first earth-works machine regarding the second earthworks machine further contains, respectively, at least one of: emissions, energy consumption or elapsed time regarding the transported material.

15. The method according to claim 1, further comprising:
determining at least one portion of the earthworks machine related to moving the tool of the earthworks machine;
determining at least one of: acceleration data or angular velocity data for the movement of the at least one portion of the earthworks machine for the location specific part of the determined work task in the earthworks construction site;
calculating a movement difference value for the at least one of: acceleration data or angular velocity data for the location specific part of the deter-mined work task in the earthworks construction site; and
determining a performance factor from the movement difference value to the location specific part of the determined work task in the earthworks construction site.

16. The method according to claim 15, wherein the earthworks machine is an excavator and the at least one portion is at least one of the following: a boom part, a joint in a boom structure, an upper carriage of the excavator or an undercarriage of the excavator.

17. The method according to claim 1, wherein the work task is an operation or a set of operations that the earthworks machine should carry out at the earthworks construction site to advance a completion of the earthworks construction site or an area to be worked on in the earthworks construction site, an area unit in the area to be worked on in the earthworks construction site or a layer in at least either of them.

* * * * *